Oct. 13, 1953  E. N. JACOBI  2,655,031
WEATHER SEALED LOCK MECHANISM
Filed May 5, 1951
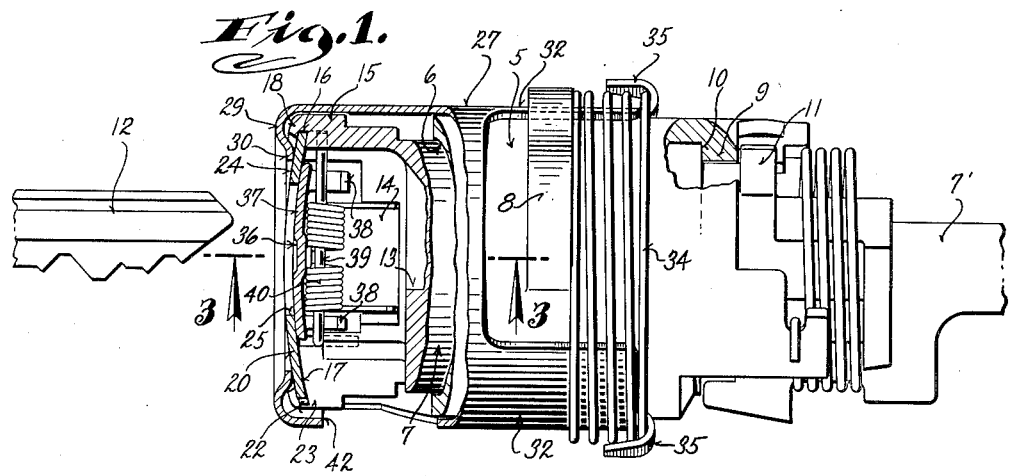
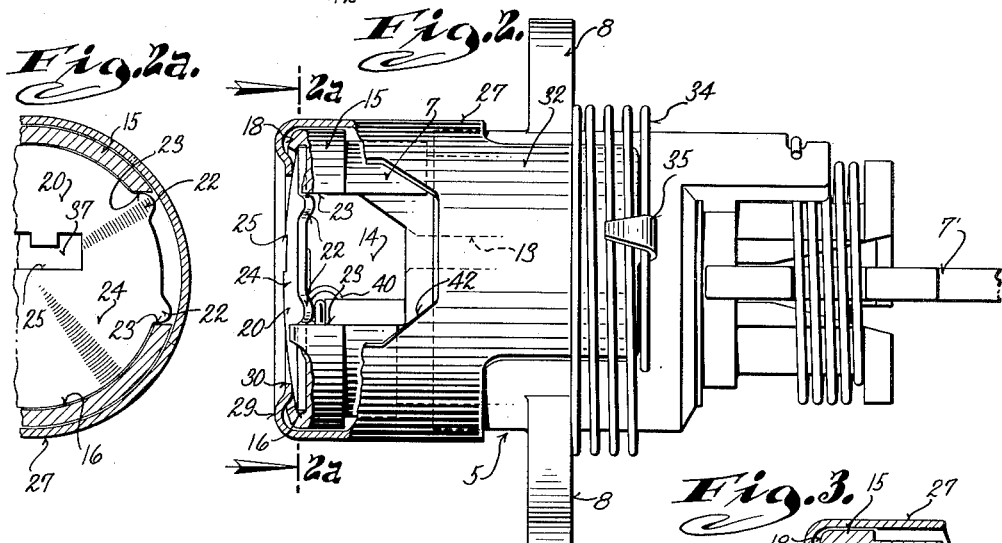
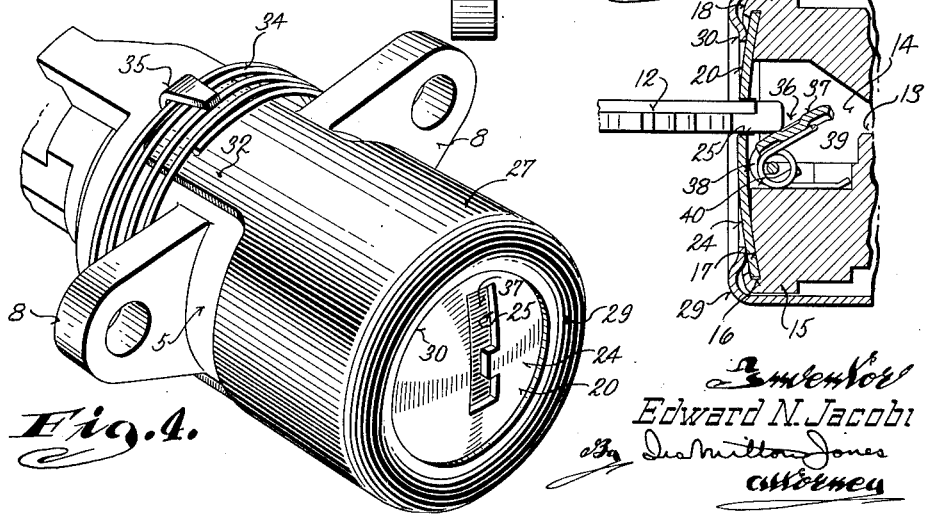
Inventor
Edward N. Jacobi
Attorney Patented Oct. 13, 1953

2,655,031

UNITED STATES PATENT OFFICE 2,655,031

WEATHER SEALED LOCK MECHANISM

Edward N. Jacobi, Milwaukee, Wis., assignor to Briggs & Stratton Corporation, Milwaukee, Wis., a corporation of Delaware Application May 5, 1951, Serial No. 224,789

8 Claims. (Cl. 70—455)

1

Like my copending application, Serial No. 220,432 filed April 11, 1951, this invention relates to lock mechanisms of the type generally used on doors and rear compartment covers of automotive vehicles, and also has as its main objective the provision of improved sealing means for preventing dust and moisture from entering the exposed front portions of the lock mechanism to thus assure the operativeness of the mechanism under all weather conditions.

While most weather sealed lock mechanisms in the past employed an external swinging cover for the mouth of the cylinder bore in the body of the lock, it is an object of this invention to provide improved weather sealing means obviating the need for the conventional externally mounted swinging cover.

More specifically, it is an object of this invention to provide a weather sealed lock mechanism on the order of that of my aforementioned copending application, and which is characterized by what amounts to a disc-like valve closure over the exposed front of the lock mechanism. In the present invention, however, a different cooperation between the elements of the seal is utilized to secure a more effective seal.

With the above and other objects in view, which will appear as the description proceeds, this invention resides in the novel construction and arrangement of parts substantially as hereinafter described, and more particularly defined by the appended claims, it being understood that such changes in the precise embodiment of the hereinafter disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a view of a lock mechanism embodying the improved weather sealing means of this invention, portions of the lock mechanism being shown in side elevation and portions being broken away and shown in longitudinal section;

Figure 2 is a bottom view of the mechanism shown in Figure 1, likewise having portions broken away and shown in section;

Figure 2A is a fragmentary detail view of a portion of the sealing means taken along the line 2A—2A of Figure 2;

Figure 3 is a sectional view taken through Figure 1 along the plane of the line 3—3; and Figure 4 is a perspective view of the weather sealed lock mechanism of this invention, viewing the same from the top and front.

2

Referring now more particularly to the accompanying drawing in which like numerals indicate like parts throughout the several views, the numeral 5 generally designates the body of a lock mechanism such as commonly used on the doors and rear compartment covers particularly of automotive vehicles. The body is substantially tubular and has a bore 6 opening to its front end to rotatably receive the lock cylinder 7 of the mechanism. Mounting lugs or ears 8 project from opposite sides of the body, intermediate its ends, to provide for securement of the lock mechanism in a position of use.

The lock cylinder has a reduced rearward extension projecting from the rear of the lock body 5 and drivingly connected with an operating shaft 7' so that rotation of the cylinder may be transmitted to the latch mechanism to be actuated. The details of the driving connection between the cylinder and the operating shaft form no part of this invention, but reference may be had to the copending application of Edward N. Jacobi Serial No. 166,088 filed June 5, 1950 for a more complete disclosure thereof. It is sufficient to note that the lock mechanism is rotatably held in the bore 6 of the body, against axial motion relative thereto, by means of an arcuate rib 9 on the rear portion of the body projecting into the bore thereof and confined between a shoulder 10 at the junction of the cylinder with its reduced rearward extension and a lug 11 formed on the extension.

It will be appreciated, of course, that the lock cylinder has tumblers (not shown) which are operated by a proper key, a portion of which is shown at 12, insertable into a key slot 13 in the cylinder opening to the front thereof. The entrance to the key slot, however, is at the bottom of a cavity 14 in the cylinder opening to the front thereof, the cavity being enlarged laterally of the key slot and opening through the bottom of the cylinder for a purpose to be later described.

The front end portion of the lock cylinder projects a distance forwardly out of the bore 6 and at its forward end has a slightly enlarged cylindrical head 15 thereon of a diameter substantially corresponding to the external diameter of the body 5. The front of the head is provided with a short bore forming a shallow well 16 having a more or less convex or spherically surfaced bottom 17. The well is concentric to the axis of the cylinder and has a diameter slightly less than the periphery of the head 16 so as to leave a narrow forwardly extending circumferential rim portion 18 at the forward extremity of the head.

The valve-like sealing member 20 of this invention is received in the well and seats against the bottom thereof. The sealing member 20 is in the form of a disc or cap of circular outline and of a diameter to snugly fit the well, and has a large diameter spherical curvature substantially corresponding to the curvature of the seat 17 at the bottom of the well so that the cap is held coaxially of the cylinder, convex side outermost, and in a position extending across substantially the entire front of the cylinder to cover the same. Preferably, the cap is formed of a relatively stiff piece of stainless sheet steel, and is fixed in the well against all motion relative to the lock cylinder by curling the rim 18 at the extreme front of the head over the marginal edge portions of the cap as seen best in Figure 3.

To prevent any tendency of the cap to rotate on its seat, lugs 22 formed on one side edge portion of the cap are extended into the cavity in the front of the cylinder to engage the opposite sides 23 of the cavity, as seen best in Figures 2 and 2A.

The cap 20 thus may be said to extend transversely across the front of the lock cylinder with the convex side 24 of the cap facing forwardly; and the cap is provided with a generally rectangular key opening 25 registering with the key slot 13 in the cylinder and of a size and shape to receive the key 12 to guide its entry into the slot.

While the cap 20 provides the fixed part of the valve-like sealing means of this invention, the movable part of the sealing means comprises a sleeve 27 slidably encircling the lock body 5 and projecting forwardly over the head 16 on the lock cylinder to encase the projecting front end portion of the cylinder. Since the enlarged head 16 of the cylinder has a diameter substantially the same as that of the body 5, the forward portion of the sleeve 27 acts to guide the rotation of the projecting front end of the lock cylinder.

At its front extremity the sleeve 27 is provided with an inturned annular flange 29 which extends radially inwardly beyond the clinched-over rim 18 and has its radially innermost edge portion 30 overlying the front side of the cap 20 a slight distance inwardly of the periphery of the cap. At its rear portion the sleeve has substantially diametrically opposite longitudinal extensions 32 projecting rearwardly along the exterior of the lock body 5 between and beyond the mounting lugs 8 on the opposite sides of the lock body.

A relatively heavy coiled compression spring 34 encircling the extensions 32 and confined between the backs of the lugs 8 and hook-like spring seats or abutments 35 on the rear extremities of the extensions 32 exerts a substantial force upon the sleeve 27 tending to slide the same rearwardly along the body, relative to the lock cylinder, to thus draw the radially innermost portion 30 on the flange 29 at the front of the sleeve into firm engagement with the spherical front of the cap 20.

Since the innermost edge of the flange defines an aperture which is coaxial with the lock cylinder, and thus coaxial with the spherical surface on the cap 20, it will be seen that a more or less line contact is effected between the flange and the cap to provide a secure weatherproof seal between the sleeve and the cap assuring against the ingress of dust or moisture at the joint therebetween. It will be noted that the sleeve is preferably formed of lighter weight stock than the cap 20, so that its flange will have a degree of resiliency sufficient to assure seating of the inner edge portion of the flange against the spherical surface on the front of the cap around the entire circumference of the flange. The sleeve is also preferably, although not necessarily, formed of stainless steel.

As in my aforementioned copending application, Serial No. 220,432 filed April 11, 1951, it is also necessary to guard against the entrance of dust or moisture into the key opening 25 in the cap 20; and a shutter 36 is likewise provided for this purpose. The shutter, of course, is mounted in the cavity 14, behind the cap 20, and its purpose is to close the key opening 25 in the cap at all times except when the key 12 is inserted in the cylinder to actuate the same.

The shutter comprises a generally rectangular body 37 having hooks 38 projecting from one side edge thereof near its ends and loosely engaging around a pivot pin 39. The pin is anchored in the front end of the body to lie perpendicular to the axis of rotation of the cylinder, and mounts the shutter for swinging motion behind the cap 20 to and from a position in which the body of the shutter engages the back of the cap to close the key opening 25 therein. In order to most effectively seal the key opening 25 the front face of the body of the shutter is formed with the same spherical curvature as the back side of the cap; and the body of the shutter is held firmly thereagainst by a torsion spring 40 encircling the pivot pin 39 and reacting between one side of the cavity 14 and the back of the shutter.

As best illustrated in Figure 3 the cavity 14 in the front of the cylinder provides ample space for the shutter to swing from its closed position shown in Figure 1 to an open position to which it is moved by the insertion of the key 12 into the key opening 25 in the cap.

Since the cavity opens to the bottom of the lock cylinder any water or moisture that might accidentally enter the key opening 25, such as during actuation of the cylinder by its key, will run out of the lock mechanism without accumulating therein. For this purpose also the sleeve 27 has an opening 42 in its side registering with the cavity 14 at the underside of the cylinder. It will be understood, of course, that the opening 42 in the sleeve is normally disposed rearwardly of the panel of the door or deck upon which the lock mechanism is mounted, and thus concealed from view.

From the foregoing description taken together with the accompanying drawing, it will be readily apparent that this invention provides improved weather sealing means for lock mechanisms, and which sealing means features simplicity and low cost of manufacture, while at the same time assuring the utmost effectiveness of the seal.

What I claim as my invention is:

1. Lock mechanism of the character described, comprising: a lock body having a bore opening to the front of the body; a key controlled lock cylinder rotatable in said bore and having a key slot opening to the front of the cylinder; a disc-like cap seated on the front end of the cylinder and covering the same, said cap having a key opening therein registering with the key slot in the cylinder; a sleeve mounted on the body for sliding motion relative to the cylinder axially thereof, the front portion of said sleeve encircling the front end of the cylinder and having an inturned annular flange thereon overlying the front side of the cap near its periphery; resilient means reacting between the body and said sleeve and tending to urge the latter rearwardly with respect to the body and the cylinder so as to hold said annular flange on the front of the sleeve firmly engaged with the front side of the cap and thus preclude the entrance of moisture into the lock mechanism past the joint between said flange and the cap; and a shutter mounted on the front portion of the cylinder behind said cap for motion toward and from a position closing the key opening in the cap and blocking the entrance of moisture into the lock mechanism through said opening.

2. Lock mechanism of the character described, comprising: a lock body having a bore therein extending forwardly of the body and opening to the front thereof; a lock cylinder rotatable in said bore with one end of the cylinder facing forwardly, said cylinder having an axial key slot therein; a disc-like cap seated on said forwardly facing end of the cylinder and substantially covering the same, said cap having a key opening therein registering with the key slot in the cylinder; a sleeve mounted on the body for sliding motion relative thereto lengthwise of the axis of rotation of the cylinder, the forward end portion of said sleeve encircling the forwardly facing end of the lock cylinder and having an inturned annular flange thereon overlying the front side of said cap near the periphery thereof; and a spring connected between the lock body and said sleeve to urge the latter rearwardly and thus hold the flange on the sleeve firmly engaged with the front side of said cap so as to establish a moisture proof seal between the sleeve and the cap.

3. The lock mechanism set forth in claim 2 wherein said cap is connected to the lock cylinder so as to be held against motion relative thereto.

4. The lock mechanism set forth in claim 2 wherein said cap is connected to the lock cylinder so as to be held against motion relative thereto; and further characterized by the provision of shutter means mounted on the front end portion of the lock cylinder behind said cap for motion toward and from a position closing the key opening therein and blocking the entrance of moisture or other foreign material into the lock mechanism through said key opening in the cap.

5. Lock mechanism of the character described, comprising: a lock body having a bore therein extending forwardly of the body and opening to the front thereof; a lock cylinder rotatable in said bore with one end thereof facing forwardly, said cylinder having an axial key slot therein; a disc-like cap seated against said forwardly facing end of the cylinder and covering the major portion thereof, said cap having a key opening therein registering with the key slot in the cylinder; a connection between the cap and the lock cylinder precluding all motion of the cap relative to the cylinder, said connection comprising a circumferential rim portion on the front end of the cylinder bent inwardly over the front of the cap along its peripheral portions to hold the cap against its seat on the front of the cylinder, and cooperating abutments on the cap and the cylinder interengaged with one another to preclude rotation of the cap on its seat; a sleeve mounted on the body for sliding motion relative thereto lengthwise of the axis of rotation of the cylinder, the forward end portion of said sleeve encircling the forwardly facing end of the cylinder and having an inturned annular flange overlying the front side of the cap radially inwardly of said rim portion; and a spring connected between the lock body and said sleeve to urge the latter rearwardly and thus hold the flange on the sleeve firmly engaged with the front side of said cap to establish a moisture proof seal between the sleeve and the cap.

6. Lock mechanism of the character described, comprising: a lock body having a bore therein extending forwardly of the body and opening to the front thereof; mounting lugs projecting from opposite sides of the lock body to provide for securement of the lock mechanism in a position of use; a lock cylinder rotatable in the body bore with one end of the cylinder facing forwardly, said cylinder having an axial key slot therein; a disc-like cap seated on said forwardly facing end of the cylinder and substantially covering the same, said cap having a key opening therein registering with the key slot in the cylinder; a sleeve mounted on the body for sliding motion relative to the body and cylinder, lengthwise of the axis of rotation of the cylinder, the forward end portion of said sleeve encircling the forwardly facing end of the lock cylinder and having an inturned annular flange thereon overlying the front side of said cap near the periphery thereof; opposite rearward extensions on said sleeve projecting rearwardly between and beyond the mounting lugs on the lock body and having abutments on their rear extremities; and a coiled expansion spring encircling said rearward extensions and confined between the abutments on their extremities and the mounting lugs on the body to urge the sleeve rearwardly and thus draw the flange on the sleeve into firm engagement with the front side of said cap to establish a moisture proof seal between the sleeve and the cap.

7. Lock mechanism of the character described, comprising: a lock body having a bore opening to the front thereof; a lock cylinder rotatable in said bore with the front end portion of the cylinder projecting a distance forwardly out of said bore, said cylinder having an axial key slot therein; a disc-like cap fixed to the front end of the cylinder and covering the same, said cap having a key opening therein registering with the key slot in the cylinder; a sleeve mounted on the body for sliding motion relative to the body and to the cylinder, lengthwise of the axis of rotation of the cylinder, the forward end portion of said sleeve encircling the front end portion of the cylinder and closely fitting the same to provide a rotation guide for the projecting front of the cylinder; an inturned annular flange on the front end of said sleeve overlying the front side of said cap near the periphery thereof; and a spring connected between the lock body and said sleeve to urge the latter rearwardly and thus draw the flange on the sleeve into firm engagement with the front side of said cap for the establishment of a moisture proof seal between the sleeve and the cap.

8. The lock mechanism set forth in claim 7 wherein the front side of the cap is convex and has a relatively large diameter spherical curvature to restrict engagement of the cap and the flange to substantially line contact between the radially inner edge portions of the flange and the spherical surface on the cap.

EDWARD N. JACOBI.

References Cited in the file of this patent
UNITED STATES PATENTS

| Number | Name | Date |
|---|---|---|
| 597,634 | Christenson | Jan. 18, 1898 |
| 676,450 | Schwartz | June 18, 1901 |
| 1,724,025 | Jacobr | Aug. 13, 1929 |